Jan. 22, 1929.
J. C. STORME
1,700,089
VEHICLE EXTRICATING DEVICE
Filed July 8, 1927      3 Sheets-Sheet 1
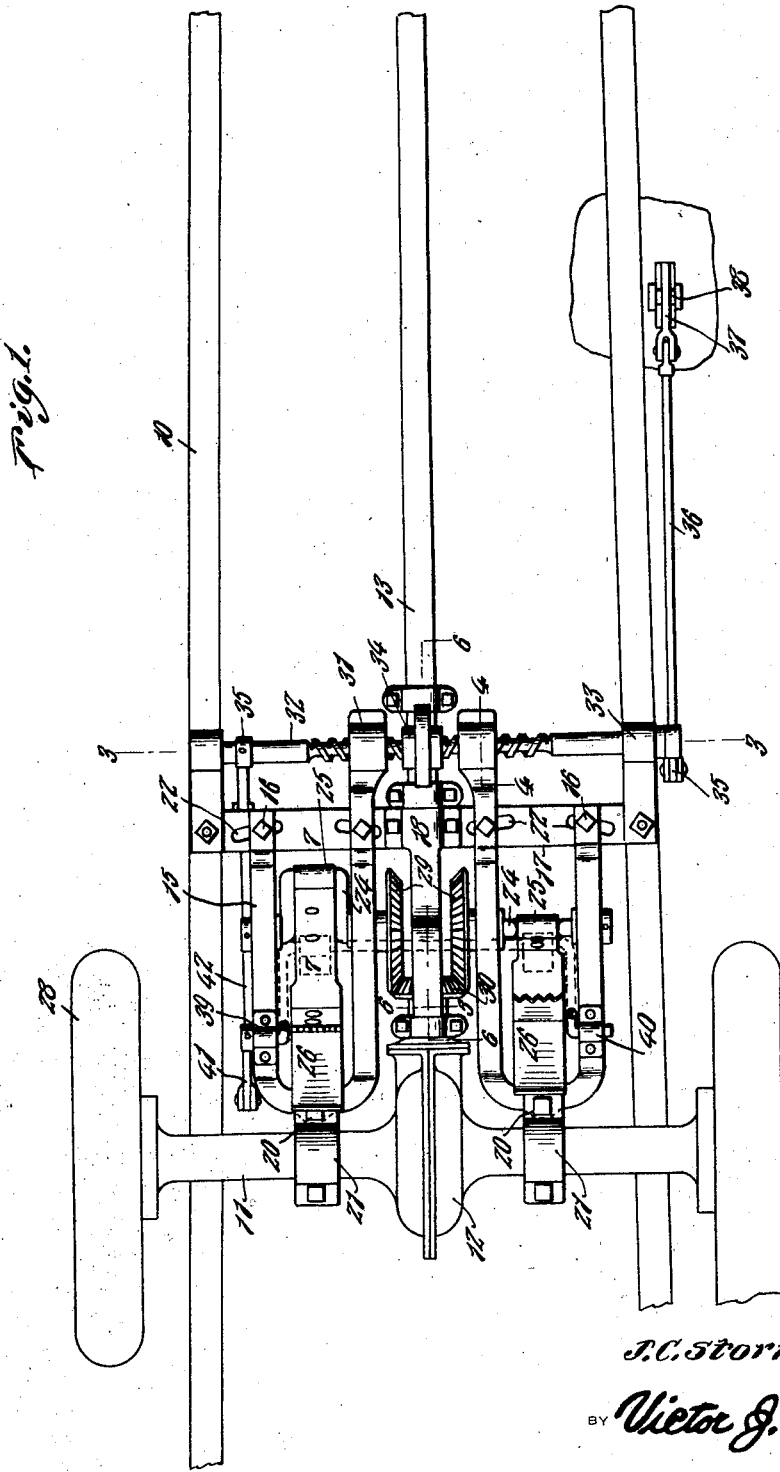
J. C. Storme
INVENTOR
BY Victor J. Evans
ATTORNEY Jan. 22, 1929.  1,700,089
J. C. STORME
VEHICLE EXTRICATING DEVICE
Filed July 8, 1927  3 Sheets-Sheet 2
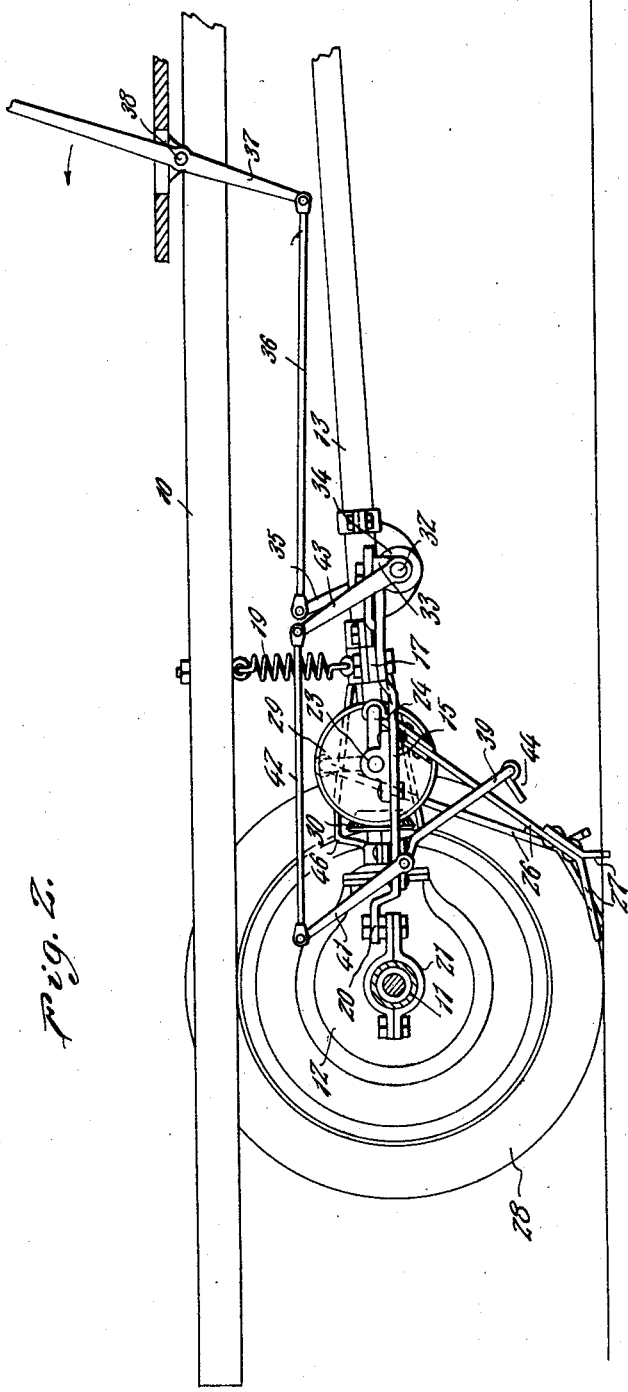

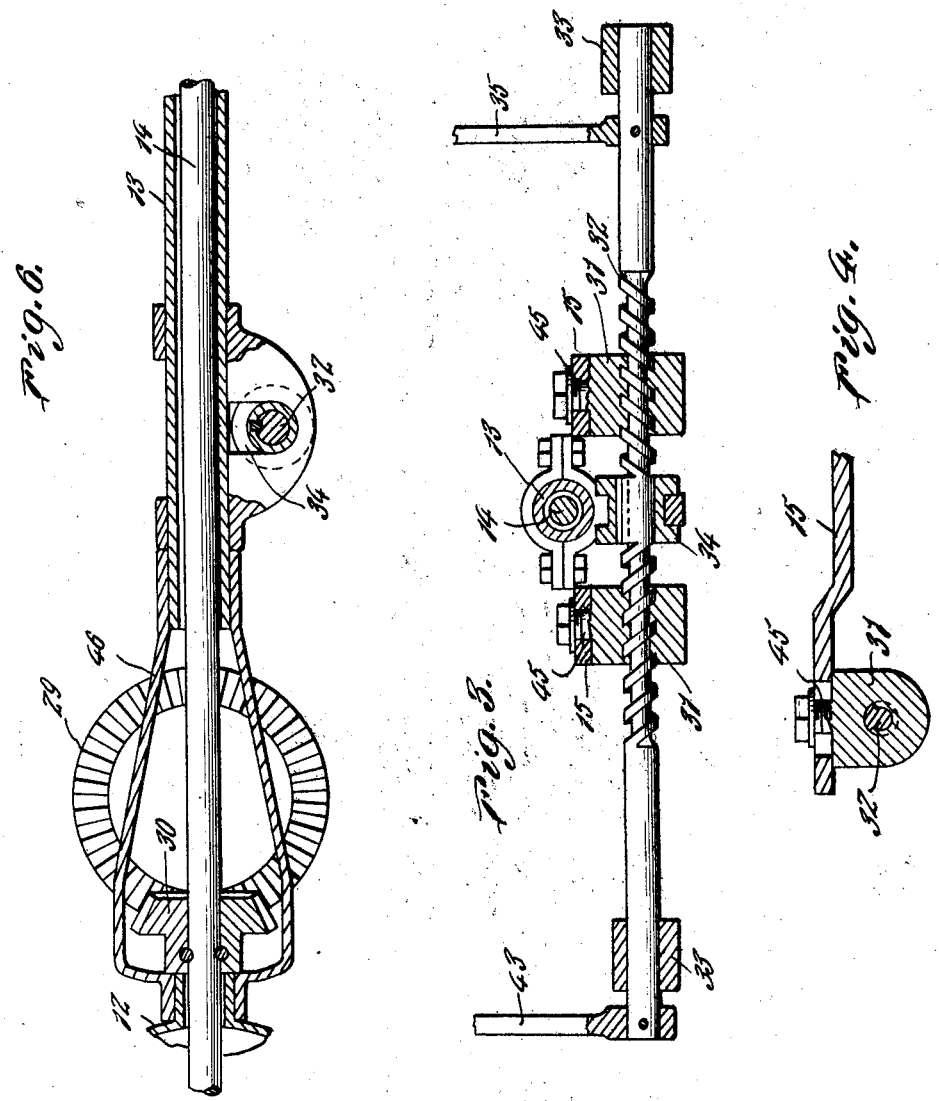

Patented Jan. 22, 1929.

1,700,089

UNITED STATES PATENT OFFICE.

JOHN C. STORME, OF ANACORTES, WASHINGTON.

VEHICLE EXTRICATING DEVICE.

Application filed July 8, 1927. Serial No. 204,319.

This invention relates to extricating devices for motor driven vehicles, and has for an object the provision of means which may be actuated by the power of a vehicle to extricate the same when the traction wheels are unable to function for this purpose.

Another object of the invention is the provision of a device of this character which may be attached, or built into a vehicle, and readily controlled by the driver for the purpose of moving the device into and out of position for use.

With the above and other objects in view, the invention further includes the following novel features and details of construction, to be hereinafter more fully described, illustrated in the accompanying drawings and pointed out in the appended claims.

In the drawings:—

Figure 1 is a bottom plan view showing a portion of the chassis of a motor vehicle with the invention applied, a portion of the holding yoke being broken away.

Figure 2 is a side elevation.

Figure 3 is an enlarged section taken substantially on the line 3—3 of Figure 1.

Figures 4, 5, 6 and 7 are enlarged fragmentary sections taken respectively on the lines 4—4, 5—5, 6—6 and 7—7 of Figure 1.

Referring to the drawings in detail wherein like characters of reference denote corresponding parts, the reference character 10 indicates the side members of the frame of a vehicle, 11 the rear axle housing which extends from the differential housing 12, while 13 indicates the housing for the drive shaft 14, all of which form a part of a motor driven vehicle of the usual type.

The invention comprises a pair of substantially U-shaped frames 15 which have their arms slidingly connected as shown at 16 with a cross bar 17, the latter being disposed transversely beneath the vehicle frame. This cross bar is secured upon the drive shaft housing 13 by means of a clamp 18 which is attached to the center portion of the bar, while the opposite ends of the bar 17 are attached to the side bars 10 by means of springs 19. The ends of the U-shaped frames remote from the bar 17 are pivotally secured as shown at 20 to members 21 which are clamped upon the axle housing 11, and as the connections 16 between the frames 15 and the bar 17 include arcuate slots 22, these frames 15 may swing upon their pivots 20.

Mounted in bearings 23 carried by each of the arms of the U-shaped frames 15 are crank arms 24. These arms 24 are relatively offset as shown in Figure 2 of the drawings and each has pivotally secured thereto as shown at 25, the inner ends of arms 26. The outer ends of the arms 26 are provided with substantially V-shaped ground engaging members 27, and when the crank shafts 24 are rotated in a manner to be described, the arms 26 will be alternately raised and lowered and will exert a forward pushing action, so that the vehicle will move forward independently of its traction wheels 28.

For the purpose of rotating the crank shafts 24, these shafts have secured to their inner ends beveled gears 29. The gears 29 are adapted to engage a pinion 30 which is fast upon the drive shaft 14. As the gears 29 are carried by the crank shafts 24 and the latter are carried by the pivotally mounted frames 15, the gears 29 may be swung horizontally into and out of engagement with the pinion 30. To accomplish this, one arm of each of the U-shaped frames 15 carries an internally threaded sleeve 31 which engages the threads of a spiral shaft 32. This shaft is mounted transversely in bearings 33 which extend from the ends of the bar 17. The shaft 32 is also provided with a central bearing 34 and the spirals of this shaft are reversely arranged.

The shaft 32 is adapted to have a rocking motion and for this purpose has connected to one of its ends an arm 35. Pivotally connected to the arm 35 is one end of a rod 36 whose opposite end is pivotally connected to an operating lever 37. This lever is pivotally mounted as shown at 38 and extends upward into the vehicle within convenient reach of the driver.

Extending transversely beneath the arms 26 is a yoke 39 whose opposite ends are mounted in bearings 40 carried by the frames 15. One end of this yoke has secured thereto an arm 41 which has pivotal connection with one end of a rod 42. The opposite end of the rod 42 is pivotally connected to an arm 43 which is secured to the spiral shaft 32. Thus, when the shaft 32 is rocked, a rocking motion will be imparted to the yoke 39. The yoke 39 carries plates or extensions 44 which are arranged to engage the arms 26.

Normally, the lever 37 is drawn rearward or in the direction of the arrow shown in Figure 2 of the drawings and in this position, the yoke 39 will be swung rearward to raise the arms 26 upward beneath the rear axle of the vehicle and out of contact with the ground. When the lever 37 is in its rearward position, the sleeves 31 of the pivoted U-shaped frames 15 will be moved laterally or in a direction away from the center of the vehicle. This movement is possible due to the fact that the sleeves have a pivotal connection with the frames 15 as indicated at 45 in Figure 4 of the drawings. The drive shaft of the vehicle is thus free to revolve without rotating the crank shafts.

By moving the lever 37 forward, the yoke 39 will be moved downward so that the arms 26 may fall into ground engaging position. Simultaneous with the downward movement of the yoke 39, the U-shaped frames 15 are swung inward due to the rocking of the shaft 32 so that the gears 29 will engage the pinion 30 and the crank shafts 24 will be rotated. Rotation of the crank shafts 24 will alternately raise and lower the arms 26 and the latter during their lowering movement will bite into the ground and force the vehicle ahead.

It is preferred to provide a split pinion 30 and to key the same to the shaft as shown in Figure 5 of the drawings. It is also preferred to secure a protecting yoke 46 to the differential and drive shaft housings 12 and 13. The forward end of the yoke 26 is also attached to the bar 17 so that the parts are securely held in place.

The invention is susceptible of various changes in its form, proportions and minor details of construction and the right is herein reserved to make such changes as properly fall within the scope of the appended claims.

Having described the invention what is claimed is:—

1. In combination with a motor driven vehicle having a drive shaft, a frame pivotally mounted at each side of the drive shaft, a crank shaft rotatably supported in each frame, ground engaging elements carried by the crank shafts for movement into and out of ground engaging position to exert a pushing action when the crank shafts are rotated, means to hold the ground engaging elements normally elevated, means to actuate the crank shafts and means to move the frames pivotally to engage the crank shafts actuating means and operate the ground engaging element holding means and to simultaneously operate the crank shafts.

2. In combination with a motor driven vehicle having a drive shaft, a frame pivotally mounted at each side of the drive shaft, a crank shaft rotatably supported in each frame, ground engaging elements carried by the crank shafts for movement into and out of ground engaging position to exert a pushing action when the crank shafts are rotated, means to hold the arms normally elevated, means carried by the crank shafts and adapted to be operatively associated with drive shaft carried means to operate the crank shafts when the frames are moved pivotally, a rock shaft, means operatively associating the rock shaft and frames to move the latter pivotally when the shaft is rocked, means operatively associating the rock shaft and arm holding means to actuate the latter and control the position of said arms and means to operate the rock shaft.

3. In combination with a motor driven vehicle having a drive shaft, a frame pivotally mounted at each side of the drive shaft, a crank shaft rotatably supported in each frame, ground engaging elements carried by the crank shafts for movement into and out of ground engaging position to exert a pushing action when the crank shafts are rotated, means to hold the arms normally elevated, means carried by the crank shafts and adapted to be operatively associated with drive shaft carried means to operate the crank shafts when the frames are moved pivotally, a rotatably mount spiral shaft, means operatively associating the spiral shaft and frames to move the latter pivotally when the shaft is rotated, means operatively associating the spiral shaft and arm holding means to actuate the latter and control the position of said arms and means to rotate the spiral shaft.

4. In combination with a motor driven vehicle having a drive shaft, a bearing frame pivotally mounted at each side of said shaft and capable of relative horizontal movement, a crank shaft rotatably supported in each frame, arms having their inner ends pivotally secured to the crank shafts and their opposite ends adapted to engage the ground to exert a pushing action when the crank shafts are rotated, means to hold the arms elevated when the crank shafts are inactive, means carried by the crank shafts for engagement with drive shaft carried means to operate said crank shafts when the frames are moved inward, means to move the frames, means to actuate the frame moving means, and means to release the arms when the frames are moved relatively inward.

In testimony whereof I affix my signature.

JOHN C. STORME.